US011320939B1

(12) United States Patent
Knowles et al.

(10) Patent No.: US 11,320,939 B1
(45) Date of Patent: May 3, 2022

(54) TOUCH SENSOR WITH MULTIPLE MODES OF OPERATION, INCREASED RELIABILITY AND EASE OF INTEGRATION

(71) Applicant: Street Smart Sensors LLC, Austin, TX (US)

(72) Inventors: Terence J. Knowles, Lake Barrington, IL (US); Charles F. Bremigan, III, Jarrell, TX (US)

(73) Assignee: Texzec, Inc., Aurora, IL (US)

( * ) Notice: Subject to any disclaimer, the term of this patent is extended or adjusted under 35 U.S.C. 154(b) by 0 days.

(21) Appl. No.: 17/443,314

(22) Filed: Jul. 23, 2021

(51) Int. Cl.
  *G06F 3/043* (2006.01)
  *G06F 3/041* (2006.01)
  *G06F 3/044* (2006.01)

(52) U.S. Cl.
  CPC ............ *G06F 3/0436* (2013.01); *G06F 3/044* (2013.01); *G06F 3/0416* (2013.01); *G06F 2203/04104* (2013.01); *G06F 2203/04106* (2013.01)

(58) Field of Classification Search
  None
  See application file for complete search history.

(56) References Cited

U.S. PATENT DOCUMENTS

| | | | |
|---|---|---|---|
| 4,642,423 A | 2/1987 | Adler | |
| 5,072,427 A | 12/1991 | Knowles | |
| 5,162,618 A | 11/1992 | Knowles | |
| 5,177,327 A | 1/1993 | Knowles | |
| 6,504,530 B1 | 1/2003 | Wilson et al. | |
| 9,658,719 B2 | 5/2017 | Knowles | |
| 9,880,044 B2 | 1/2018 | Knowles et al. | |
| 10,678,380 B2 | 6/2020 | Hecht et al. | |
| 2009/0195518 A1* | 8/2009 | Mattice | G07F 17/3209 345/177 |
| 2014/0267175 A1* | 9/2014 | Hecht | G06F 3/0436 345/177 |
| 2016/0154495 A1* | 6/2016 | Sha | G06F 3/0436 345/177 |

OTHER PUBLICATIONS

Onoe, Morio, Mechanical Input Admittance of Ultrasonic Delay Lines Operating in Torsional or Shear Modes, the Journal of the Acoustical Society of America, Jul. 1963, pp. 1003-1008, vol. 35, No. 7, AIP Publishing, United States of America.
Martin, Tom A., The IMCON Pulse Compression Filter and its Applications, IEEE Transactions on Sonics and Ultrasonics, Apr. 1973, vol. SU-20, No. 2.

* cited by examiner

*Primary Examiner* — Stephen T. Reed
(74) *Attorney, Agent, or Firm* — Levenfeld Pearlstein, LLC

(57) ABSTRACT

A touch panel has a substrate having first and second surfaces, and defines a touch surface. A first portion of a touch system includes a first plurality of echelons on the first surface in a first array along a first centerline. Each echelon is formed at an angle to the first centerline, and a first shear transducer assembly on the edge of the substrate that generates a shear wave in a source wave mode in a first direction along the first centerline. A second portion of the touch system includes a second plurality of echelons on the first surface in a second array along a second centerline, each echelon at a second angle to the second centerline. The second centerline is orthogonal to the first. A second shear transducer assembly is mounted on the edge and generates a shear wave in a source wave mode in a second direction along the second centerline. The first sensing mode is different from the second sensing mode.

42 Claims, 10 Drawing Sheets

Acoustic touch on top surface of display cover glass
Projected Capacitive touch on the backside of the display cover glass.
Top surface shown

TOUCH SENSOR WITH MULTIPLE MODES OF OPERATION, INCREASED RELIABILITY AND EASE OF INTEGRATION

BACKGROUND

The present application pertains to touch sensors such as touch screens, and more particularly, to touch screen that operate using multiple modes of operation.

Acoustic touch panels operating with shear, surface and Lamb waves are known. Surface Acoustic or SAW sensors are sensitive to water on the touch surface, require four transducers per panel, and have problems mounting to a display. In addition, the acoustic arrays create a loss of display viewing area. Lamb wave touch sensors can have improved operation in the presence of water on the touch surface depending on operating conditions, and can be close in touch sensitivity to SAW. Shear wave touch sensors are much less sensitive to water on the surface and can be very sensitive to touch.

Acoustic touch panels have had limited commercial success compared to projected capacitance touch sensors, such as those used on, or example, mobile phones and tablets. This is due to a number of factors including the high sensitivity to touch or sliding finger that projected capacitance touch sensors exhibit. In addition, projected capacitance touch sensors are lightweight, straightforward to integrate into a display, allow bezel free operation and are capable of what is known as multi touch. Multi touch capability provides for recognition of the positions of multiple simultaneous touches on a screen.

Although projected capacitance touch sensors are tremendously popular and in widespread use, they do have a number of drawbacks. First, these sensors emit electromagnetic radiation and have greater light reflectivity than transparent glass panels. Moreover, projected capacitance touch sensors are difficult and expensive to scale up to large screen sizes. Importantly, such sensor are sensitive to water and gloved operation requires special gloves.

Wilson et al, U.S. Pat. No. 6,504,530, 2003 discloses one approach to combining different touch systems to enhance reliability.

Accordingly, there is a need for touch sensors that are impervious to residue, such as water, oils other contaminants and the like, operate with gloves, have low EMI, can be increased in size without difficulty. Desirably, such a touch sensor is comparable to projected capacitance in touch sensitivity, and allows for easy integration and bezel free operation. More desirably still, such a touch sensor also allows for redundancy or parallel touch systems mounted to one display to enhance reliability and versatility.

SUMMARY

In an aspect, embodiments of the present touch sensors are impervious to residue such as water, oils, other contaminants and the like, operate with gloves, have low EMI, can be increased in size without difficulty, and are comparable to projected capacitance in touch sensitivity. The present touch sensor also provide for ease of integration and bezel free operation. Such touch sensors can be adopted for mission critical applications, providing redundancy in that parallel systems can be mounted to or integrated into one display, to enhance reliability and versatility.

In one aspect, a touch panel comprises a substrate having first and second surfaces and edges extending between the first and second surfaces defining a thickness. The substrate defines a touch surface.

The panel includes a first portion of a touch system having a first plurality of echelons arranged on the first surface of the substrate in a first array along a first centerline, each echelon in the first plurality of echelons formed at a first angle relative to the first centerline, and a first shear transducer assembly mounted on the edge of the substrate, the first transducer assembly configured to generate a shear wave in a source wave mode in a first direction along the first centerline.

The panel further includes a second portion of the touch system having a second plurality of echelons arranged on the first surface of the substrate in a second array along a second centerline, each echelon in the second plurality of echelons formed at a second angle relative to the second centerline, and a second shear transducer assembly mounted on the edge of the substrate, the second transducer assembly configured to generate a shear wave in a source wave mode in a second direction along the second centerline. The second centerline is orthogonal to the first centerline.

In such an embodiment the shear wave generated by the first shear wave transducer assembly propagates along the first centerline and wherein the shear wave is reflected at the first angle by the one or more of the plurality of echelons in the first array to a first sensing wave or the shear wave is converted to a different wave mode than the source mode, wherein the first sensing wave is reflected off of an edge opposing the first centerline and is sensed by the first transducer assembly, and the shear wave generated by the second shear wave transducer assembly propagates along the second centerline and wherein the shear wave is reflected at the second angle by the one or more of the plurality of echelons in the second array to a second sensing wave or the shear wave is converted to a different wave mode than the source mode, wherein the second sensing wave is reflected off of an edge opposing the second centerline and is sensed by the second transducer assembly. The first sensing mode may be different from the second sensing mode.

In embodiments the touch panel can further include arrays on the opposite or second surface of the substrate. In such embodiment the panel may include a third portion of a touch system having a third plurality of echelons arranged on the second surface of the substrate in a third array along a third centerline, each echelon in the third plurality of echelons formed at a third angle relative to the third centerline, the third centerline being parallel to the first centerline, the third array overlying or underlying the first array and a fourth portion of the touch system having a fourth plurality of echelons arranged on the second surface of the substrate in a fourth array along a fourth centerline, each echelon in the fourth plurality of echelons formed at a fourth angle relative to the fourth centerline, the fourth centerline being parallel to the second centerline, the fourth array overlying or underlying the second array.

In such embodiments, the echelons of the first plurality of echelons overlie the echelons of the third plurality of echelons and the echelons of the second plurality of echelons overlie the echelons of the fourth plurality of echelons.

Alternatively, in such embodiments, the echelons of the first plurality of echelons are staggered relative to the echelons of the third plurality of echelons and the echelons of the second plurality of echelons are staggered relative to the echelons of the fourth plurality of echelons.

In another aspect, the touch panel may include a third portion of a touch system having a third plurality of echelons arranged on the first or second surface of the substrate in a third array along a third centerline, each echelon in the third plurality of echelons formed at a third angle relative to the third centerline, and a third shear transducer assembly mounted on the edge of the substrate, the third transducer assembly configured to generate a shear wave in a source wave mode in a third direction along the third centerline. In such embodiments, the third portion of the touch system is configured to detect residue on the touch surface.

When the third portion of the touch system detects the presence of residue on the touch surface it can, for example, reduce a touch sensitivity of the first and/or second touch portions. Alternately, when the third portion of the touch system detects the presence of residue on the touch surface it can change a frequency of the first and/second transducer assemblies.

In embodiments, the first, second and third transducer assemblies each are a pair of transducers. The transducers of each pair are oriented to generate stresses in opposite directions.

In some embodiments, a portion of the substrate defines a plane, and wherein the substrate has edges that are bent transverse to the plane to define bent portions. The panel may further include one or more recesses in the edge at the bent portion and wherein the first and/or the second shear transducers are mounted to the edge in the one or more recesses. The edges can be bent having a radius of curvature of greater than two times the wavelength of the greater of the first and second sensing waves.

In embodiments, the pluralities of echelons are etched into the substrate and the echelons are filled with a material having a refractive index about equal to a refractive index of the substrate.

In another aspect, a touch panel comprises a substrate having first and second surfaces and edges extending between the first and second surfaces defining a thickness, the substrate defining a touch surface. A first portion of a touch system comprises a first plurality of echelons arranged on the first surface of the substrate in a first array along a first centerline, each echelon in the first plurality of echelons formed at a first angle relative to the first centerline, and a first shear transducer assembly mounted on the edge of the substrate, the first transducer assembly configured to generate a shear wave in a source wave mode in a first direction along the first centerline;

The touch panel further includes a second portion of the touch system that comprises a second plurality of echelons arranged on the first surface of the substrate in a second array along a second centerline, each echelon in the second plurality of echelons formed at a second angle relative to the second centerline, and a second shear transducer assembly mounted on the edge of the substrate, the second transducer assembly configured to generate a shear wave in a source wave mode in a second direction along the second centerline. The second centerline is orthogonal to the first centerline.

The panel further includes a third portion of the touch system that comprises a third plurality of echelons arranged on the first or second surface of the substrate in a third array along a third centerline, each echelon in the third plurality of echelons formed at a third angle relative to the third centerline, the third centerline being parallel to the first centerline and a fourth portion of the touch system that comprises a fourth plurality of echelons arranged on the first or second surface of the substrate in a fourth array along a fourth centerline, each echelon in the fourth plurality of echelons formed at a fourth angle relative to the fourth centerline, the fourth centerline being parallel to the second centerline.

In such embodiments, the shear wave generated by the first shear wave transducer assembly propagates along the first centerline and wherein the shear wave is reflected at the first angle by the one or more of the plurality of echelons in the first array to a first sensing wave or the shear wave is converted to a different wave mode than the source mode, wherein the first sensing wave is reflected off of an edge opposing the first centerline and is sensed by the first transducer assembly, and the shear wave generated by the second shear wave transducer assembly propagates along the second centerline and wherein the shear wave is reflected at the second angle by the one or more of the plurality of echelons in the second array to a second sensing wave or the shear wave is converted to a different wave mode than the source mode, wherein the second sensing wave is reflected off of an edge opposing the second centerline and is sensed by the second transducer assembly.

The first, second, third and fourth portions of the touch system can operate in a similar sensing mode or in different sensing modes, and the third portion of the touch system and the fourth portion of the touch system can be redundant to the first portion of the touch system and the second portion of the touch system. In embodiments, the third and fourth arrays are on the first surface.

In some embodiments, the touch panel further includes a fifth portion of a touch system that comprises a fifth plurality of echelons arranged on the second surface of the substrate in a fifth array along a fifth centerline, each echelon in the fifth plurality of echelons formed at a fifth angle relative to the fifth centerline, the fifth centerline being parallel to the first centerline, the fifth array overlying or underlying the first array, a sixth portion of the touch system that comprises a sixth plurality of echelons arranged on the second surface of the substrate in a sixth array along a sixth centerline, each echelon in the sixth plurality of echelons formed at a sixth angle to the sixth centerline, the sixth centerline being parallel to the second centerline, the sixth array overlying or underlying the second array, a seventh portion of the touch system that comprises a seventh plurality of echelons arranged on the second surface of the substrate in a seventh array along a seventh centerline, each echelon in the seventh plurality of echelons formed at a seventh angle relative to the seventh centerline, the seventh centerline being parallel to the third centerline, the seventh array overlying or underlying the third array, and an eighth portion of the touch system, that comprises an eighth plurality of echelons arranged on the second surface of the substrate in an eighth array along an eighth centerline, each echelon in the eighth plurality of echelons formed at an eighth angle relative to the eighth centerline, the eighth centerline being parallel to the fourth centerline, the eighth array overlying or underlying the fourth array.

In some embodiments, the second array is on the first surface and the third and fourth arrays are on the second surface. The echelons of the first plurality of echelons can overlie the echelons of the fifth plurality of echelons, the echelons of the second plurality of echelons can overlie the echelons of the sixth plurality of echelons, the echelons of the third plurality of echelons can overlie the echelons of the seventh plurality of echelons, and the echelons of the fourth plurality of echelons can overlie the echelons of the eighth plurality of echelons.

Alternatively, the echelons of the first plurality of echelons can be staggered relative to the echelons of the fifth plurality of echelons, the echelons of the second plurality of echelons can be staggered relative to the echelons of the sixth plurality of echelons, the echelons of the third plurality of echelons can be staggered relative to the echelons of the seventh plurality of echelons, and the echelons of the fourth plurality of echelons can be staggered relative to the echelons of the eighth plurality of echelons.

In some embodiments, the first and second transducer assemblies are each a pair of transducers. And, in some embodiments, the third portion of the touch system includes a third transducer assembly and the fourth portion of the touch system includes a fourth transducer assembly. In some embodiments, the first, second, third and fourth transducer assemblies are each a pair of transducers. The transducers of each pair of transducers can be oriented to generate stresses in opposite directions.

In some embodiments, a portion of the substrate defines a plane, and wherein the substrate has edges that are bent transverse to the plane to define bent portions. The substrate can further include one or more recesses in the edge at the bent portion and the first and second shear transducers can be mounted to the edge in the recesses.

The touch panel can further include one or more additional recesses in the edge at the bent portion and the third and fourth shear transducer assemblies can be mounted to the edge in the one or more additional recesses.

In some embodiments, the edges are bent having a radius of curvature of greater than two times the wavelength of the greater of the first and second sensing waves.

In some embodiments, the first, second, third and fourth pluralities of echelons are etched into the substrate and the echelons are filled with a material having a refractive index about equal to a refractive index of the substrate. In some embodiments, the fifth, sixth, seventh, and eighth pluralities of echelons are etched into the substrate and wherein the echelons are filled with a material having a refractive index about equal to a refractive index of the substrate.

In another aspect, a touch panel, comprises a substrate having first and second surfaces, an acoustic touch system incorporated onto the first surface and a capacitance touch system incorporated onto the second surface.

In some embodiments, the substrate is a single substrate. Alternatively, the substrate is two or more substrates, and the substrates are laminated to one another. In such an embodiment, the first surface is a touch surface.

It will be appreciated that there are advantages of higher order shear and Lamb modes in a plate that enhance reliability. This includes the ability, in contrast to SAW, to reflect efficiently from an opposing edge and operate with sub millimeter thick glass. An acoustic array touch sensor according to the present disclosure using reflection from an opposing edge requires just two arrays. Thus, two edges are all that is required to determine both x and y coordinates. This allows for a separate set of arrays and transducers on the two remaining edges, which second set of arrays and transducers can have an identical or a different sensing mode to aid in touch discrimination and redundancy. This is very useful not just for higher reliability but, for example, when operating primarily with higher order shear as the sensing mode with sensitivity set high enough to respond to a lightly touched sliding finger. At this sensitivity a false touch may occur due to residue, such as water droplets. As such, a second sensing mode that is very sensitive to residue is an additional aid in determining if the touch event is valid or false. Alternative modes may also be generated with two array, three array and four array sensors either by array design or frequency switching.

In addition, in contrast to SAW, touch panels for shear and Lamb sensing modes maybe as thin as desired. Projected capacitance touch screens, now ubiquitous in cell phones and many other products, are typically protected with sub millimeter thick cover glass. Sub millimeter glass is preferred because projected capacitance sensors operate more effectively with thin glass covers.

Due to the ability of shear and Lamb mode acoustic touch sensors to operate with sub millimeter glass in contrast to SAW, combining a capacitive touch sensor with the disclosed acoustic sensors is now practical. The combined sensor maybe a single sheet of glass with acoustic arrays and thin film patterned capacitive arrays on the lower glass surface or multiple layers with a separate layer for the acoustic and capacitive sensors.

It is now also possible to either use the cover glass as the substrate for a shear/Lamb acoustic touch panel with a separate underlying capacitive sensor, or to combine a capacitive sensor with the disclosed acoustic touch system on a single sheet of glass.

It has also been found that as presented in the present disclosure the restrictions of previous touch sensors has been overcome through the selection of optimum sensing waves of an acoustic sensor and the ability to switch from one sensing mode to another. This includes, for example, changing from one acoustic mode to another or from a capacitive to an acoustic mode and vice versa depending on the touch panel environment. These attributes and the resulting increase in reliability extend the range of applications for touch panels.

As noted, the panel may be as thin or thick as desired, operates with very low electromagnetic radiation, may operate underwater and be responsive to gloves. In addition, by either rendering the necessary acoustic arrays invisible or by bending the touch panel at it's edges, it has been found that the touch sensitive region can be extended to the edges of a display and provide what is known as 'bezel free' operation or design. Contouring or indenting an edge where transducers are bonded renders the transducers invisible to a user and provides a protective enclave to enhance reliability and ease of integration to a display. Collectively these improvements may increase the utility and range of applications for acoustic touch sensors.

Further understanding of the present disclosure can be obtained by reference to the following detailed description in conjunction with the associated drawings, which are briefly described below.

BRIEF DESCRIPTION OF THE DRAWINGS

Various embodiments of an acoustic array touch sensor panel are disclosed as examples and are not limited by the figures of the accompanying drawings, in which like references may indicate similar elements and in which.

DETAILED DESCRIPTION

Figure 1:
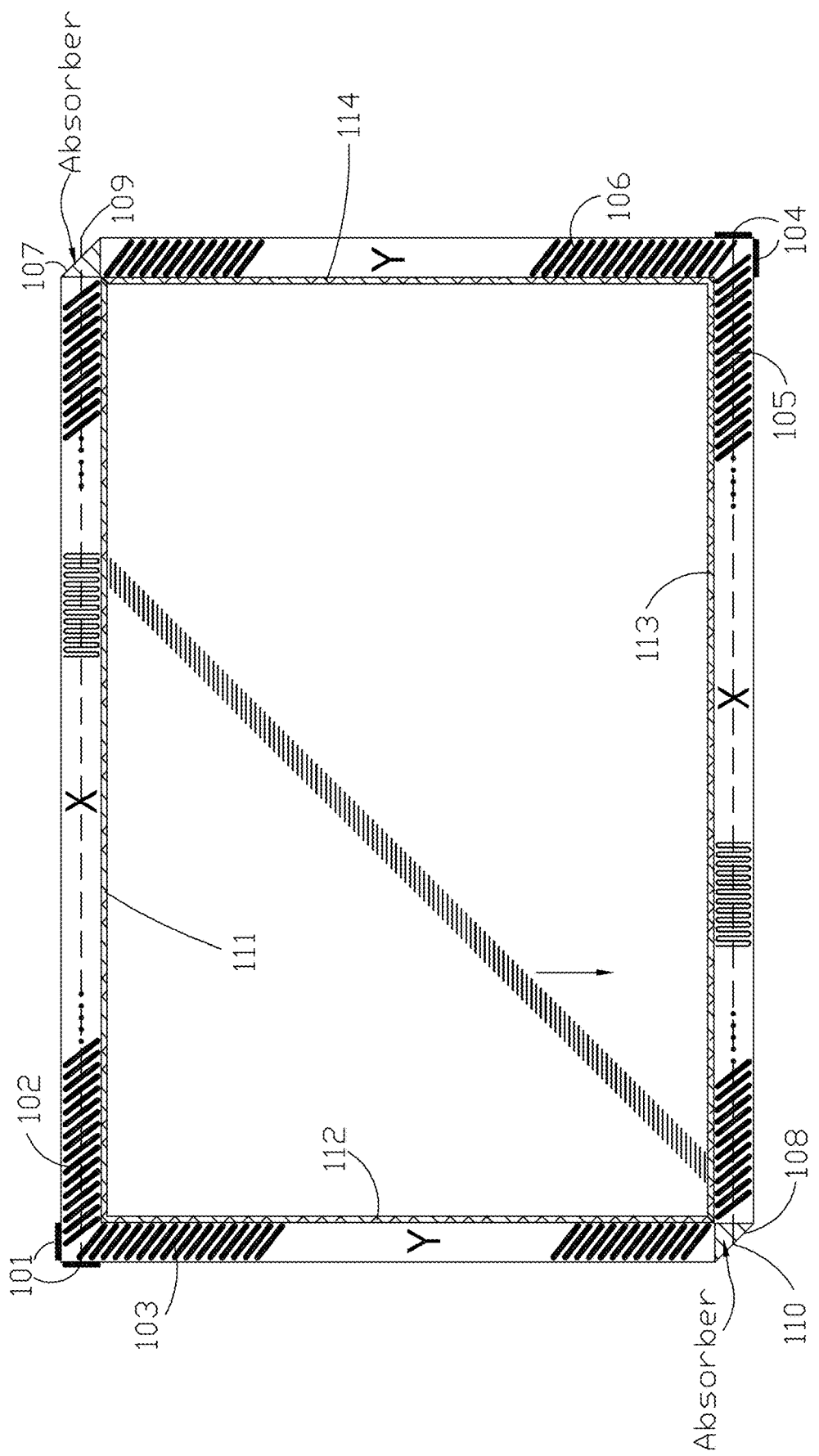
FIG. 1 is a front view of an embodiment of an acoustic touch sensor with multiple modes of operation according to the present disclosure.

While the present disclosure is susceptible of embodiments in various forms, there is shown in the drawings and will hereinafter be described presently preferred embodiments with the understanding that the present disclosure is to be considered an exemplification and is not intended to limit the disclosure to the specific embodiment illustrated.

Acoustic sensors amenable to methods and procedures are disclosed in copending Knowles, U.S. patent application Ser. No. 17/240,190. Use is made of reflection from an opposing edge to form acoustic touch sensors with two arrays. This allows for a duplicate set of arrays and transducers on the opposing sides and edges of the touch panel as shown in FIG. 1 in which transducer assemblies 101, x and y arrays 102, 103, respectively, and diverter edges 107, 108, are shown. For purposes of this portion of the disclosure, an array (for example, the x array) and its respective transducer are referred to as a first portion of the touch system and the other array, for example, the y array and its transducer are referred to as a second portion of the touch system. In the illustrated embodiment, collimation grooves 111, 112, 113 and 114 are also shown. In this embodiment, a preferred diverter 107, 108 angle α is 45 degrees. A second set of arrays 105, 106 and transducer assembly 104 is also shown. This second set of transducers 104 may be connected to the same electronic processing unit 1002 (see, FIG. 10) as the first set 101 or it may have its own processing unit. The first set of transducers 101 and the second set of transducers 104 may function sequentially or in the event of a failure of one set of arrays, the other set of arrays can be activated to provide redundancy and increased reliability.

The second set of arrays 105, 106 may have a sensing mode identical to or different from the first set of arrays 102, 103. For example the first set of arrays 102, 103 may be a higher order shear source mode to a Lamb sensing mode sufficiently sensitive to track a moving finger on a display screen but unable to detect touch in the presence of residue on the screen. The second set of arrays 105, 106 may be a higher order shear source mode to a higher order shear sensing mode with limited sensitivity to a moving finger but impervious to residue on the screen.

Residue, such as water, oils or other fluids and/or contaminants may be detected using a detection algorithm. Residue may be detected in contrast to a finger touch or gloved hand touch, through the magnitude of the response. Residue on the touch surface with Lamb sensing modes, for example, can cause much more signal attenuation that a bare finger. Other distinguishing effects include the width of the touch region, motion on the region, the response changing sign with respect to a datum, and multiple simultaneous touch events. For example, the mode of operation may be changed from a SAW mode (residue sensitive) to a mode using the present acoustic sensor (residue insensitive). Alternatively the residue sensitive mode may be used to aid in determining if a touch event detected with the first set is valid.

The ability to change from one set of arrays and transducers to another on the same touch panel together with multiple sensing modes provides an extended range of applications as well as redundancy for enhanced reliability.

Also shown in FIG. 1 are two absorbers, 109, 110 whose function is to attenuate source modes that upon reflection may interfere with touch detection as discussed in the accompanying patent. One suitable material for the absorbers is a polyurethane adhesive, such as a polyurethane glass adhesive 590 (commercially available from 3M company), which has been shown to function effectively as an absorber of shear modes when applied to a panel surface. Other suitable materials include acrylics and the like. Those skilled in the art will recognize other suitable materials that will function as a shear absorber.

Figure 2:
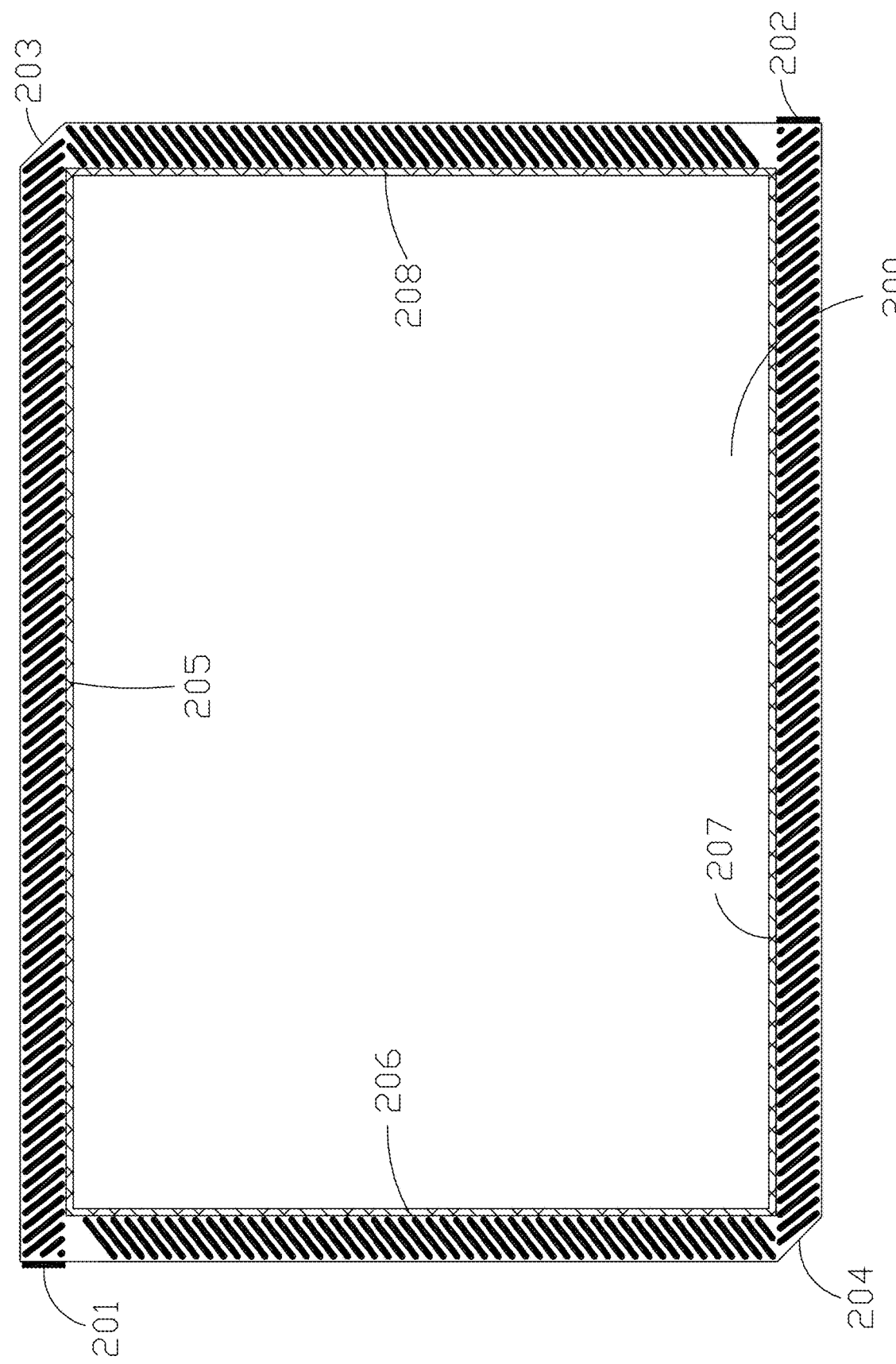
FIG. 2 is a front view of another embodiment of an acoustic touch sensor with multiple modes of operation according to the present disclosure.

FIG. 2 shows a single transducer assembly but now with a second single transducer assembly 202 (i.e., a pair of single transducer assemblies) using the additional edges of the panel. Here, the sensor includes the pair of transducer assemblies 201, 202, and 45 degree reflectors 203, 204. Collimation grooves 205-208 are also shown. Touch sensors have become ubiquitous, and for mission critical applications a very high level of reliability is required; both redundancy and different types of touch sensing may be desirable, for example acoustic and capacitive sensing.

Figure 3:
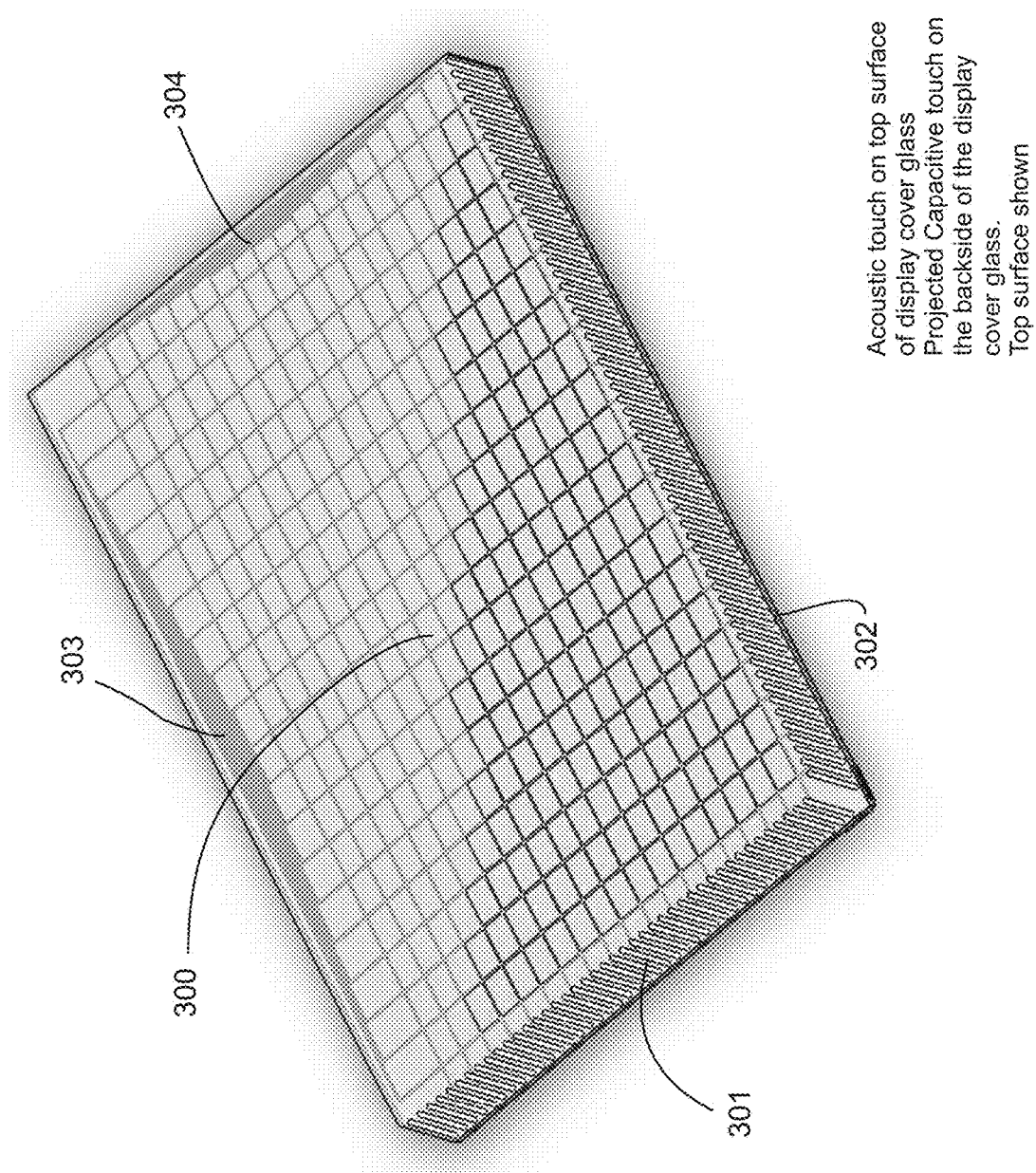
FIG. 3 is a perspective view of an embodiment of a touch sensor having both acoustic and capacitive touch capability.

In this regard, it has been found that conducting and insulating thin films deposited on a glass panel required for capacitive touch sensors do not affect the transmission of shear and Lamb waves. This allows for projected capacitance touch sensing metallization on a lower panel surface and acoustic arrays on both surfaces for example as illustrated in FIG. 3. In this embodiment, the combined sensor system now has the sensitivity and multi touch features of a capacitive sensor with the gloved operation and residue insensitivity of the present acoustic sensors described herein.

FIG. 3 illustrates a capacitive and acoustic touch sensor 300. The top and bottom surfaces, one indicated at 301, contain the arrays for the acoustic array sensor. The projected capacitance connections and lead outs 303 and 304 are along the edges adjacent edges the two array acoustic sensor. This eliminates any potential problems in depositing conducting layers required for the capacitive sensor over etched echelons that may be required for acoustic arrays. Combining a capacitive sensor with an acoustic sensor on a single glass panel is not limited to two array sensors and may operate with four arrays such as that illustrated in FIG. 2) for additional reliability. The system illustrated in FIG. 3 is a single glass panel version of a combined sensor. The acoustic touch sensors disclosed may also be combined with capacitive sensors that use multiple layers and incorporate a cover glass.

There is tremendous flexibility of the combined acoustic/capacitance system. For example, the systems can be formed on a single substrate with the acoustic touch system on the front (e.g., the user "touch" side) of the substrate and the capacitance system, typically a metallized layer, on the back side of the substrate. Alternately, the touch system can be formed on a first substrate (on the front of the substrate or on the back of the substrate or on the front and back of the substrate with one array on the front of the substrate and the other array on the back of the substrate) and the capacitance touch system on a second substrate, with the first and second substrates laminated to one another.

Figure 4:
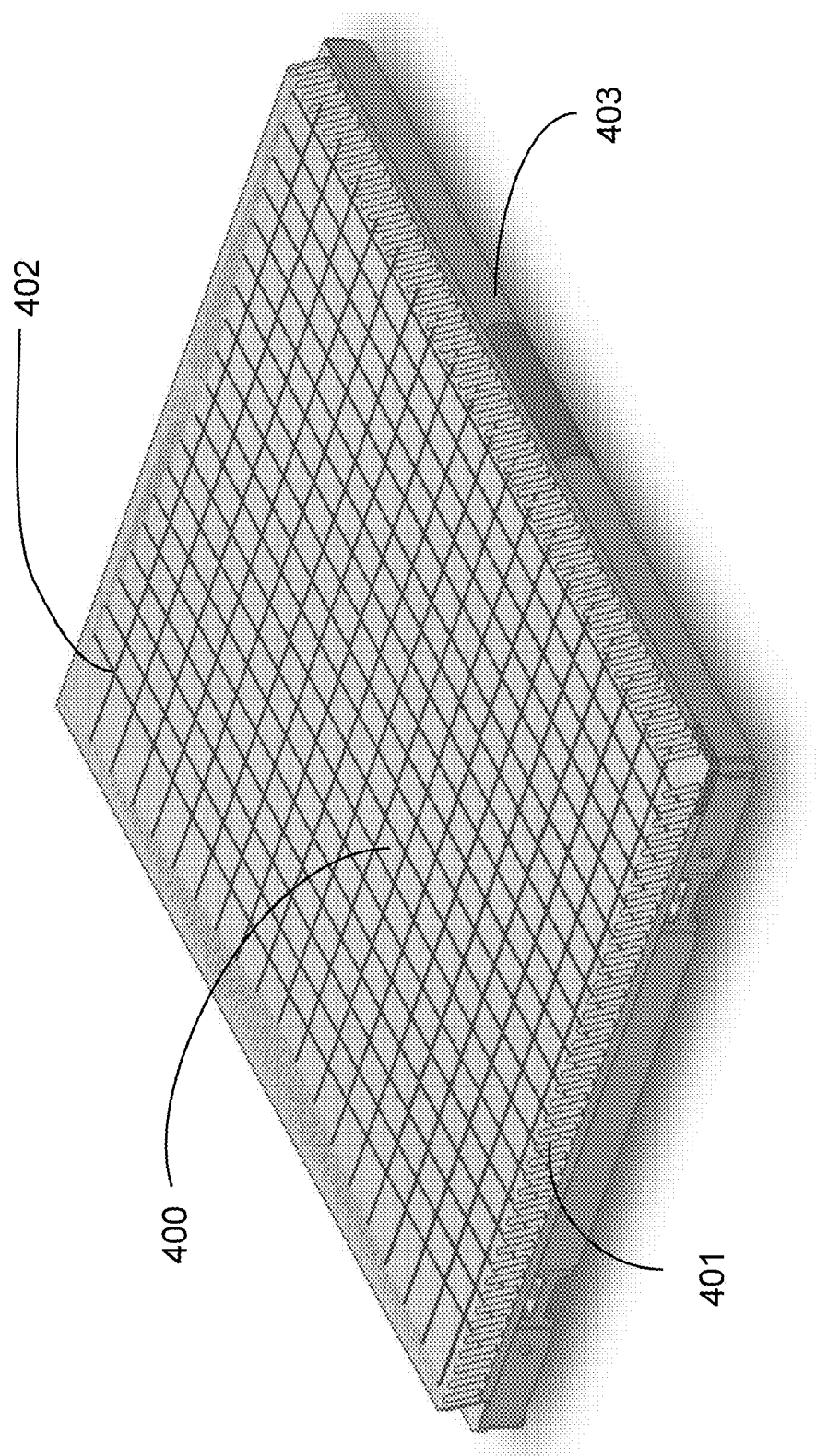
FIG. 4 is another perspective view of an embodiment of a touch sensor having both acoustic and capacitive touch capability; and attached to a display

Cover glass, particularly for portable products using touch screens, may be less than a millimeter thick. Because the acoustic touch sensors disclosed have no thickness limitations, unlike SAW, the cover glass may be utilized as a touch panel as shown schematically in FIG. 4. Here, the arrays 401 for the acoustic sensor 400 are shown, as is the underlying display 403. The capacitive layers are represented at 402. When shear modes are used as the sensing modes in this arrangement, the cover glass may be laminated to an underlying display to enhance impact resistance and readability in sun light due to reduced light reflection. Shear modes are not greatly attenuated by the silicone adhesives used for lamination.

Figure 5:
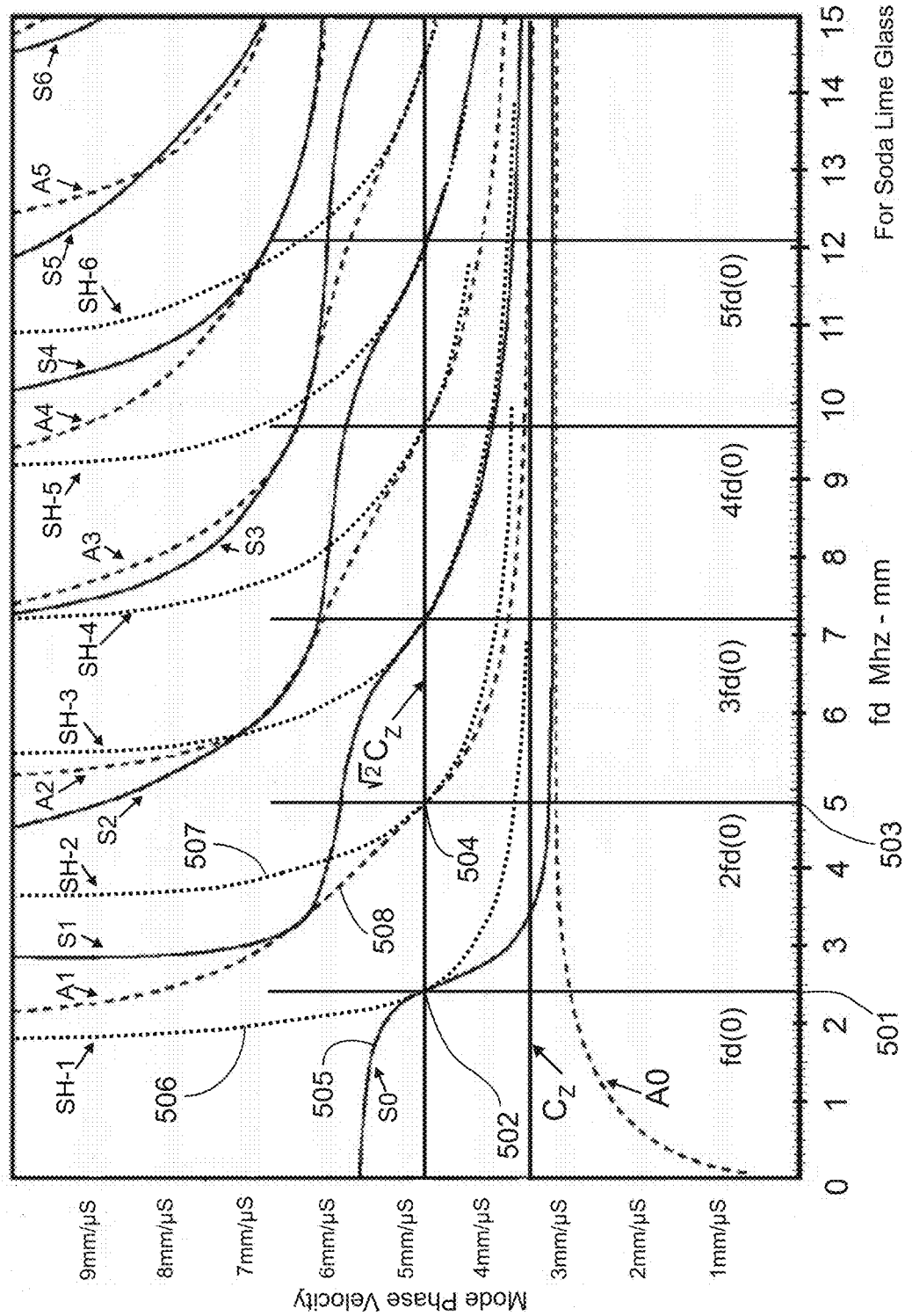
FIG. 5 is a dispersion diagram derived from the general wave equation for an elastic plate and includes Lamb and transverse shear modes.

Switching from one sensing mode to another does not necessarily require a separate transducer assembly and set of arrays. It is a feature of waves in a plate that all higher order shear and Lamb modes at a phase velocity equal to the square root of two times the lowest order shear mode wave velocity Cz, will have an operating frequency for a fixed panel thickness that is an integral multiple of the zeroth order of the symmetric Lamb modes S0, (as at 502, FIG. 5). Where fd is defined at that particular fd as fd(0) as shown in FIG. 5. (see, 501). At this particular phase velocity and at multiples of fd (e.g., 2fd(0), 3fd(0), 4fd(0)), a Lamb mode either A or S and a shear mode (SH) are always present together (see, for example 504 in FIG. 5). Another feature is that the symmetry of the shear and Lamb modes at a given fd will always differ and will alternate from one fd to the next. Compare for example, in FIGS. 5, 502 and 504 where the symmetry of the shear and Lamb modes differ.

For example, using double arrays to select S0, 502 as a sensing mode with non dispersive lowest order shear as the source mode, as disclosed in the aforementioned Knowles, U.S. patent application Ser. No. 17/240,190, the double arrays in this case will be spatially aligned because both source and shear modes are symmetric and SH1 506, which is anti-symmetric, is suppressed. The frequency is now doubled to 2fd(0) 503 and, because the lowest order shear mode is non dispersive, the source wavelength is halved. Doubling the frequency doubles the fd and the symmetric mode SH2 507 will be selected and Lamb wave A1, 508 will be suppressed. This assumes that the array response allows a lowest order shear source to a SH2 sensing mode conversion as is shown in FIG. 6.

Figure 6:
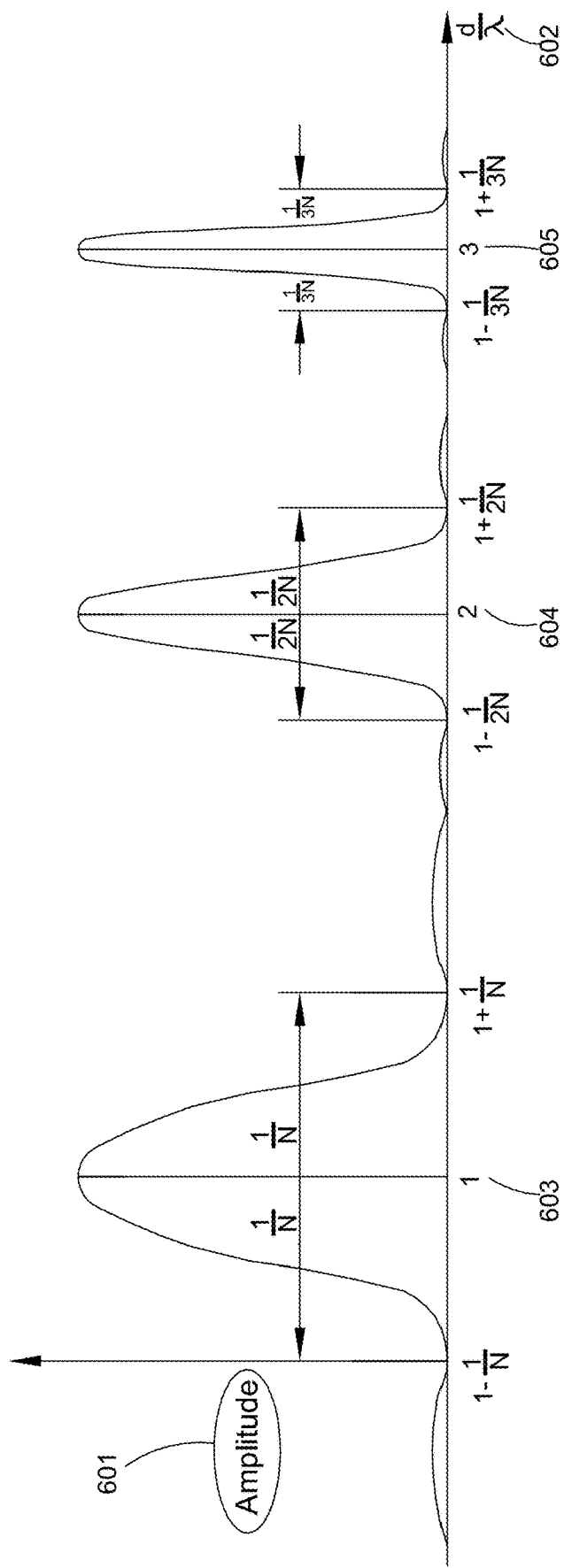
FIG. 6 is a plot of the amplitude response for waves generated in an acoustic touch panel array.

FIG. 6 denotes the amplitude of the array response 601, versus the echelon spacing d, divided by wavelength (d/λ) as indicated at 602. As shown, there are array peaks, examples of which are shown at 603, 604 and 605, when the wavelength λ is equal to the echelon spacing d, at one half the echelon spacing, one third of the echelon spacing, and so on. In fact, because the wavelength λ is inversely proportional to frequency, the array peaks at all multiples of the original frequency that generates S0. Therefore we can switch from S0 which will have predominately out of plane wave motion at the surface to SH2 which will be an in plane shear mode, simply by doubling the operating frequency, which coincides with another peak in the array response.

Because of the characteristics of waves in a plate at a phase velocity of the lowest order shear times the square root of two, it is possible with a non dispersive source mode to switch from one fd to another at other values other than those given in the example, and other combinations will be obvious to those skilled in the art. Frequency switching from S0 to SH2 for example allows the sensor to operate predominately with the S0 sensing mode with the presence of a residue algorithm to determine if water for example is present on the touch surface. A touch event caused by residue can then be ignored, with the option that the sensor switch to SH2 which may be less touch sensitive but will not create false touch events in the presence of water.

Detecting water or other contaminants (collectively, "residue") on a touch screen is an important feature when operation in outdoor environments is required. When the sensing mode is a Lamb wave with predominant out of plane wave motion at the surface, water droplets for example drastically attenuate the waves at the droplet position. The droplets are either stationary or move in a characteristic manner that can be readily distinguished from a bare or gloved finger.

High attenuation, stationary or characteristic motion along with simultaneous multiple touch events are features of residue on a screen with out of plane modes, and can be programmed into an algorithm. When residue is detected with Lamb sensing modes, a redundant system may switch to a higher order shear sensing mode with residue immunity and somewhat less responsive to a very light touch. When a higher order shear sensing mode is employed, either as a single or redundant system, the sensitivity may also be adjusted when residue is detected without changing modes. For example the default sensitivity for higher order shear sensing modes may be such to enable detection of a moving finger with very light touch pressure. This sensitivity may cause the sensor to falsely respond to residue on the screen. On detection of water, the sensitivity may be lowered below that to cause a false response but high enough for a stationary finger touch event.

It is possible with a two array system to have one array with a higher order shear sensing mode, the x array for example, while the y array produces a different sensing mode with higher sensitivity to a finger and residue. For example, water on the screen will cause a characteristic response on the y axis, but will be ignored if there is not a corresponding response from the x coordinate and a false response avoided. This can be extended to a three array system where an x and a y array are operated for example with higher order shear with sufficient sensitivity to respond to an extremely light touch. This may cause sensitivity to residue on the screen. A third array with a sensing mode that has an unequivocal response to residue can then be employed, and via an algorithm, direct the system to either accept or ignore the touch event from the sensing pair.

Given the ability to select modes with different characteristics together with the various array and sensor combinations disclosed, it will be obvious to those skilled in the art that other combinations such as touch and pen operation can be made and are within the scope and spirit of the present disclosure.

In another aspect, it will be appreciated that the trend in products using touch screens is bezel free operation. That is the viewing area extends to the edges of the display. This is a challenge with acoustic array sensors because there are arrays on the periphery of the touch panel that may extend into the viewing area.

Acoustic touch sensors as described in the present disclosure can use only two arrays and may have reduced array widths compared to existing acoustic touch sensors. However, this may not be sufficient for some bezel free display applications. Knowles, U.S. Pat. No. 9,880,044, FIG. 9A shows that a plate capable of supporting shear and Lamb modes can be bent without loss of any intended function. The condition under which this can be accomplished is that the radius of curvature of the bend be greater than several wavelengths of the sensing wave used. Wavelengths are typically in the half to one and a half millimeter range. As such, bending the edges of a glass plate is feasible for the touch sensors described in the present disclosure because the glass is typically a millimeter or less thick and array echelons are typically etched. The temperatures required to bend glass are typically below that at which the echelons deform significantly.

Figure 7:
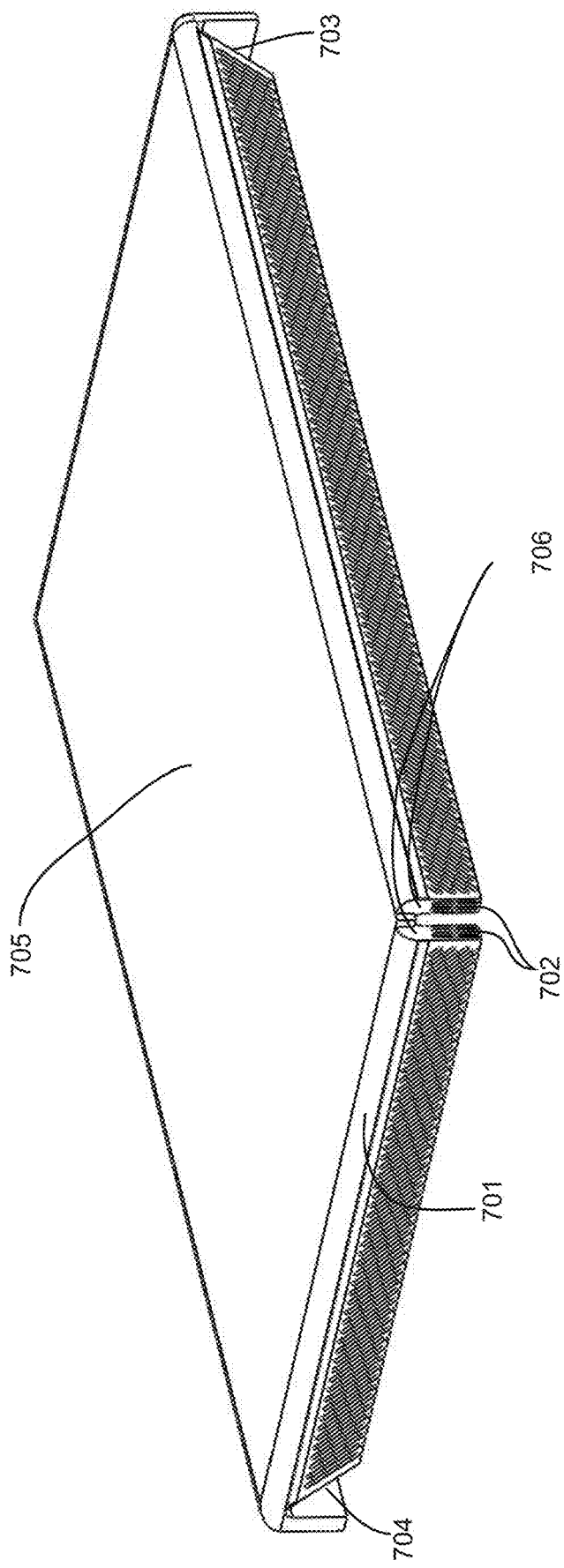
FIG. 7 is a perspective view of a sensor having a bent glass plate.

FIG. 7 illustrates a two array sensor, it will, however, be appreciated that the sensor is not limited to two arrays, with the panel, typically, but not limited to a transparent glass bent to form a touch panel. The bend is illustrated at 701 in the glass plate 705. The transducers 702 are bonded to the edges with the glass cut out or channeled (as indicated at 706) prior to bending to accommodate the spacing required for transducer 702 placement and for edge diverter 703, 704 accommodation. In practice a radius of curvature of 3 mm has no effect on operation. The arrays typically etched may be formed before or after the bending process. The panel can be mounted over the display and provides edge to edge touch sensitivity and viewing area.

The transducers are made of a ceramic or crystal material that tends to be brittle. They are typically less wide than the thickness of the touch panel, have a length equal to the array width and a thickness that is less than about 0.4 mm for the touch panels disclosed. As such, the transducers have a low profile when bonded to the edge of the panel. The transducers require electrical contacts, that are typically a soldered wire and may need a conductive shield to reduce electromagnetic radiation.

Figure 8:
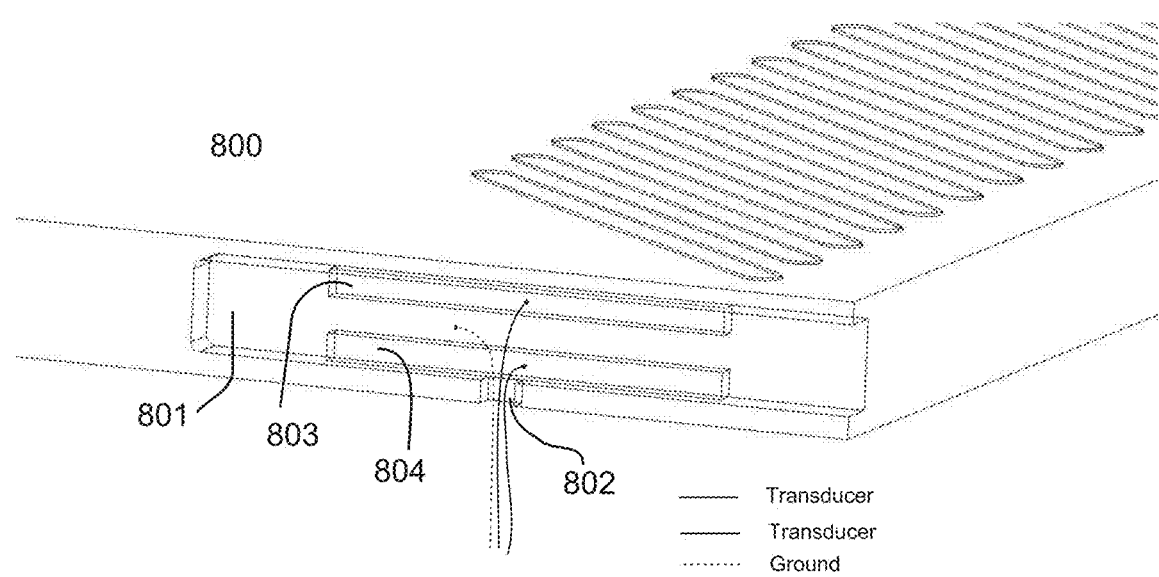
FIG. 8 is a perspective view of the sensor of FIG. 7 with the transducers positioned in edge recesses in the sensor.

Referring to FIG. 8, in order to reduce the possibility of damage due to mechanical contact it has been found that creating a recess or channel 801 in the edge of the panel at about a corner at which the transducer is located permits countersinking or "hiding" the transducers and is an effective way of protecting the transducers. The transducer pair 803, 804 is bonded to the edges in the recess or channel 801. The recess or channel can be formed by abrasive machining or like methods. The recess are contemplated to be about typically 2 mm deep and will not affect the acoustic properties of the sensor.

The conductors/wires attached to the transducers are shown extending through a notch 802 in the sensor panel to guide and protect the conductors/wires. Alternatively, a conductive strip and a conductive adhesive can be used to provide electrical contact to/from the transducers. Other means by which electrical contact to/from the transducers will be recognized by those skilled in the art. A conductive shield (not shown) may also be used.

Bending a touch panel and creating recesses enlarges viewing area and increases reliability, but it also adds cost. Accordingly, another method of increasing viewing area is to render the arrays invisible. This may be accomplished with etched arrays by filling the echelons with a transparent material that matches the refractive index of the touch panel. One suitable material is a hard silicone.

Figure 9:
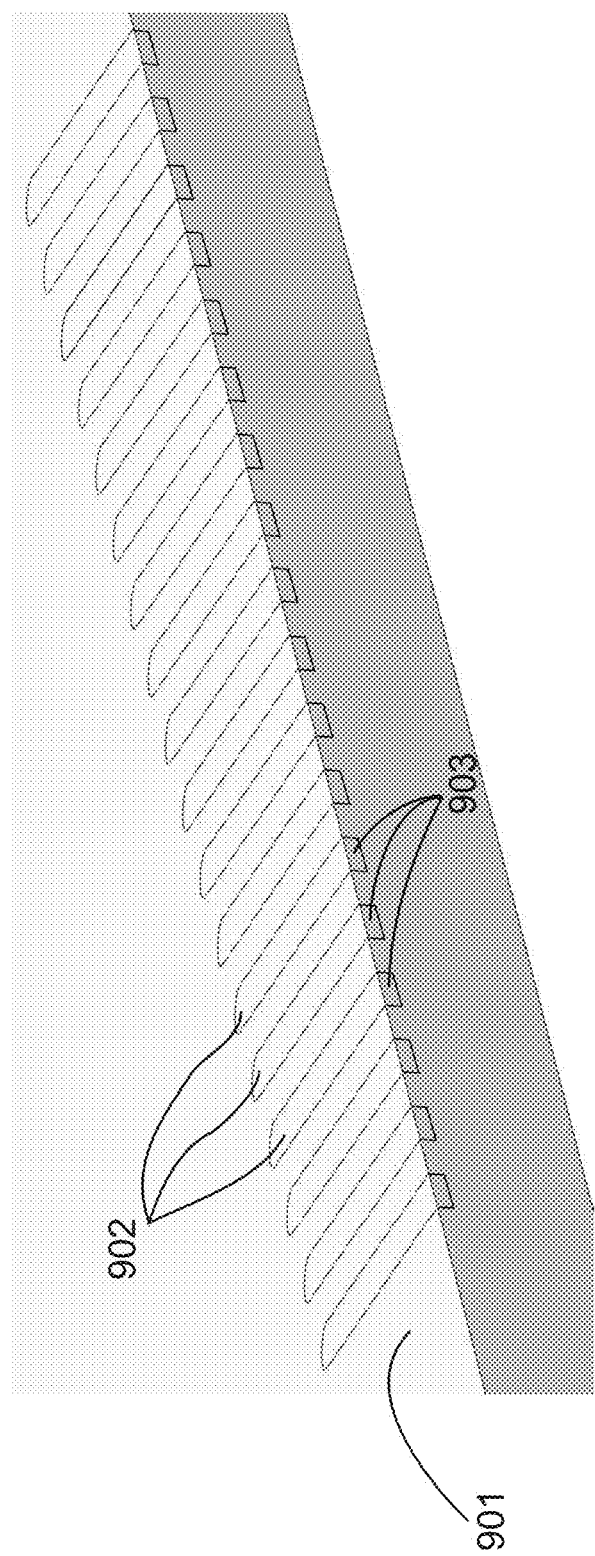
FIG. 9 is a partial perspective view of a sensor etched echelons filled with an index matching material.

FIG. 9 illustrates an embodiment having a glass panel 901 with etched echelons 902 that are filled with a transparent index matching material 903. The material reduces the visibility of the arrays. The index matching material may be an organic or mineral compound, and should completely fill the echelons with no inclusions and have a refractive index equal or close to that of the touch panel. In such an embodiment, the arrays can now be exposed when mounted to a bezel free display but are typically sufficiently narrow that there is no loss in touch sensitivity across the touch panel.

Figure 10:
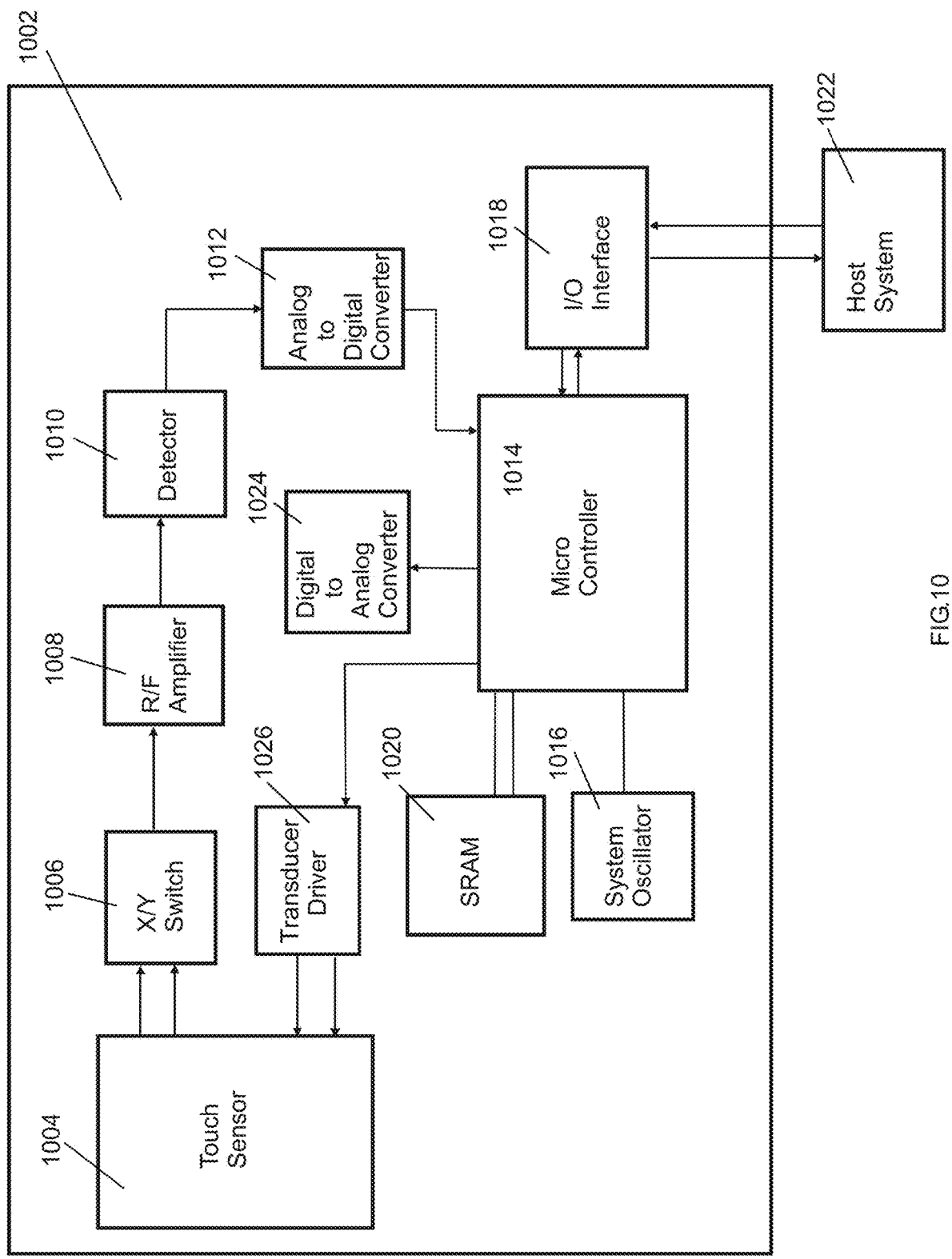
FIG. 10 is a block diagram of an example of a control system for a touch sensor with multiple modes of operation, increased reliability and ease of integration.

FIG. 10 is a block diagram of an example of a control system 1002 for the touch sensor 1004. The system 1002 includes the touch sensor 1004, an X/Y switch 1006, and RF amplifier 1008, a detector 1010, and an analog to digital converter (A/D converter) 1012 and a microcontroller 1014. The A/D converter 1012, a system oscillator 1016, an I/O interface 1018 an SRAM 1020 are all in communication with the microcontroller 1014. A host system 1022 is in communication with the I/O interface 1018.

A digital to analog converter (D/A converter) 1024 is in communication with the microcontroller 1014 and the RF amplifier 1008. A transducer driver 1026 is in communication with the microcontroller 1014 and the touch sensor 1004.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as sides, upper, lower, top, bottom, rearward, forward and the like are for explanatory purposes only and are not intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

The invention claimed is:

1. A touch panel, comprising:
a substrate having first and second surfaces and edges extending between the first and second surfaces defining a thickness, the substrate defining a touch surface;
a first portion of a touch system comprising:
a first plurality of echelons arranged on the first surface of the substrate in a first array along a first centerline, each echelon in the first plurality of echelons formed at a first angle relative to the first centerline;
a first shear transducer assembly mounted on the edge of the substrate, the first transducer assembly configured to generate a shear wave in a source wave mode in a first direction along the first centerline;
a second portion of the touch system, comprising:
a second plurality of echelons arranged on the first surface of the substrate in a second array along a second centerline, each echelon in the second plurality of echelons formed at a second angle relative to the second centerline, the second centerline being orthogonal to the first centerline; and
a second shear transducer assembly mounted on the edge of the substrate, the second transducer assembly configured to generate a shear wave in a source wave mode in a second direction along the second centerline,
wherein the shear wave generated by the first shear wave transducer assembly propagates along the first centerline and wherein the shear wave is reflected at the first angle by the one or more of the plurality of echelons in the first array to a first sensing wave or the shear wave is converted to a different wave mode than the source mode, wherein the first sensing wave is reflected off of an edge opposing the first centerline and is sensed by the first transducer assembly, wherein the shear wave generated by the second shear wave transducer assembly propagates along the second centerline and wherein the shear wave is reflected at the second angle by the one or more of the plurality of echelons in the second array to a second sensing wave or the shear wave is converted to a different wave mode than the source mode, wherein the second sensing wave is reflected off of an edge opposing the second centerline and is sensed by the second transducer assembly, and wherein the first sensing mode is different from the second sensing mode.

2. The touch panel of claim 1, further including:
a third portion of a touch system comprising:
a third plurality of echelons arranged on the second surface of the substrate in a third array along a third centerline, each echelon in the third plurality of echelons formed at a third angle relative to the third centerline, the third centerline being parallel to the first centerline, the third array overlying or underlying the first array; and
a fourth portion of the touch system, comprising:
a fourth plurality of echelons arranged on the second surface of the substrate in a fourth array along a fourth centerline, each echelon in the fourth plurality of echelons formed at a fourth angle relative to the fourth centerline, the fourth centerline being parallel to the second centerline, the fourth array overlying or underlying the second array.

3. The touch panel of claim 2, wherein the echelons of the first plurality of echelons overlie the echelons of the third plurality of echelons.

4. The touch panel of claim 3, wherein the echelons of the second plurality of echelons overlie the echelons of the fourth plurality of echelons.

5. The touch panel of claim 2, wherein the echelons of the first plurality of echelons are staggered relative to the echelons of the third plurality of echelons.

6. The touch panel of claim 5, wherein the echelons of the second plurality of echelons are staggered relative to the echelons of the fourth plurality of echelons.

7. The touch panel of claim 1, further including a third portion of a touch system comprising:
a third plurality of echelons arranged on the first or second surface of the substrate in a third array along a third centerline, each echelon in the third plurality of echelons formed at a third angle relative to the third centerline;
a third shear transducer assembly mounted on the edge of the substrate, the third transducer assembly configured to generate a shear wave in a source wave mode in a third direction along the third centerline,
wherein the third portion of the touch system is configured to detect residue on the touch surface.

8. The touch panel of claim 7, wherein when the third portion of the touch system detects the presence of residue on the touch surface it reduces a touch sensitivity of the first and/or second touch portions.

9. The touch panel of claim 7, wherein when the third portion of the touch system detects the presence of residue on the touch surface it changes a frequency of the first and/second transducer assemblies.

10. The touch panel of claim 1, wherein the first and second transducer assemblies each are a pair of transducers.

11. The touch panel of claim 10, wherein the transducers of each pair are oriented to generate stresses in opposite directions.

12. The touch panel of claim 1, wherein a portion of the substrate defines a plane, and wherein the substrate has edges that are bent transverse to the plane to define bent portions.

13. The touch panel of claim 12, further including one or more recesses in the edge at the bent portion and wherein the first and/or the second shear transducers are mounted to the edge in the one or more recesses.

14. The touch panel of claim 13, further including first and second recesses in the edge at the bent portion and wherein the first and second shear transducers are mounted to the edge in the first and second recesses, respectively.

15. The touch panel of claim 12, wherein the edges are bent having a radius of curvature of greater than two times the wavelength of the greater of the first and second sensing waves.

16. The touch panel of claim 1, wherein the first and second pluralities of echelons are etched into the substrate and wherein the echelons are filled with a material having a refractive index about equal to a refractive index of the substrate.

17. A touch panel, comprising:
a substrate having first and second surfaces and edges extending between the first and second surfaces defining a thickness, the substrate defining a touch surface;
a first portion of a touch system comprising:
a first plurality of echelons arranged on the first surface of the substrate in a first array along a first centerline, each echelon in the first plurality of echelons formed at a first angle relative to the first centerline;
a first shear transducer assembly mounted on the edge of the substrate, the first transducer assembly configured to generate a shear wave in a source wave mode in a first direction along the first centerline;
a second portion of the touch system, comprising:
a second plurality of echelons arranged on the first surface of the substrate in a second array along a second centerline, each echelon in the second plurality of echelons formed at a second angle relative to the second centerline, the second centerline being orthogonal to the first centerline; and
a second shear transducer assembly mounted on the edge of the substrate, the second transducer assembly configured to generate a shear wave in a source wave mode in a second direction along the second centerline,
a third portion of the touch system, comprising:
a third plurality of echelons arranged on the first or second surface of the substrate in a third array along a third centerline, each echelon in the third plurality of echelons formed at a third angle relative to the third centerline, the third centerline being parallel to the first centerline; and
a fourth portion of the touch system, comprising:
a fourth plurality of echelons arranged on the first or second surface of the substrate in a fourth array along a fourth centerline, each echelon in the fourth plurality of echelons formed at a fourth angle relative to the fourth centerline, the fourth centerline being parallel to the second centerline; and
wherein the shear wave generated by the first shear wave transducer assembly propagates along the first centerline and wherein the shear wave is reflected at the first angle by the one or more of the plurality of echelons in the first array to a first sensing wave or the shear wave is converted to a different wave mode than the source mode, wherein the first sensing wave is reflected off of an edge opposing the first centerline and is sensed by the first transducer assembly, wherein the shear wave generated by the second shear wave transducer assembly propagates along the second centerline and wherein the shear wave is reflected at the second angle by the one or more of the plurality of echelons in the second array to a second sensing wave or the shear wave is converted to a different wave mode than the source mode, wherein the second sensing wave is reflected off of an edge opposing the second centerline and is sensed by the second transducer assembly, wherein the first, second, third and fourth portions of the touch system can operate in a similar sensing mode or in different sensing modes, and wherein the third portion of the touch system and the fourth portion of the touch system are redundant to the first portion of the touch system and the second portion of the touch system.

18. The touch panel of claim 17, wherein the third and fourth arrays are on the first surface.

19. The touch panel of claim 18, further including:
a fifth portion of a touch system comprising:
a fifth plurality of echelons arranged on the second surface of the substrate in a fifth array along a fifth centerline, each echelon in the fifth plurality of echelons formed at a fifth angle relative to the fifth centerline, the fifth centerline being parallel to the first centerline, the fifth array overlying or underlying the first array;
a sixth portion of the touch system, comprising:
a sixth plurality of echelons arranged on the second surface of the substrate in a sixth array along a sixth centerline, each echelon in the sixth plurality of echelons formed at a sixth angle relative to the sixth centerline, the sixth centerline being parallel to the second centerline, the sixth array overlying or underlying the second array;
a seventh plurality of echelons arranged on the second surface of the substrate in a seventh array along a seventh centerline, each echelon in the seventh plurality of echelons formed at a seventh angle relative to the seventh centerline, the seventh centerline being parallel to the third centerline, the seventh array overlying or underlying the third array; and
an eighth portion of the touch system, comprising:
an eighth plurality of echelons arranged on the second surface of the substrate in an eighth array along an eighth centerline, each echelon in the eighth plurality of echelons formed at an eighth angle relative to the eighth centerline, the eighth centerline being parallel to the fourth centerline, the eighth array overlying or underlying the fourth array.

20. The touch panel of claim 17, wherein the second array is on the first surface and the third and fourth arrays are on the second surface.

21. The touch panel of claim of claim 19, wherein the echelons of the first plurality of echelons overlie the echelons of the fifth plurality of echelons.

22. The touch panel of claim 21, wherein the echelons of the second plurality of echelons overlie the echelons of the sixth plurality of echelons.

23. The touch panel of claim of claim 22, wherein the echelons of the third plurality of echelons overlie the echelons of the seventh plurality of echelons.

24. The touch panel of claim 23, wherein the echelons of the fourth plurality of echelons overlie the echelons of the eighth plurality of echelons.

25. The touch panel of claim of claim 19, wherein the echelons of the first plurality of echelons are staggered relative to the echelons of the fifth plurality of echelons.

26. The touch panel of claim 25, wherein the echelons of the second plurality of echelons are staggered relative to the echelons of the sixth plurality of echelons.

27. The touch panel of claim 26, wherein the echelons of the third plurality of echelons are staggered relative to the echelons of the seventh plurality of echelons.

28. The touch panel of claim 27, wherein the echelons of the fourth plurality of echelons are staggered relative to the echelons of the eighth plurality of echelons.

29. The touch panel of claim 17, wherein the first and second transducer assemblies are each a pair of transducers.

30. The touch panel of claim 17, wherein the third portion of the touch system includes a third transducer assembly and the fourth portion of the touch system includes a fourth transducer assembly.

31. The touch panel of claim 30, wherein the first, second, third and fourth transducer assemblies are each a pair of transducers.

32. The touch panel of claim 31, wherein the transducers of each pair of transducers are oriented to generate stresses in opposite directions.

33. The touch panel of claim 17, wherein a portion of the substrate defines a plane, and wherein the substrate has edges that are bent transverse to the plane to define bent portions.

34. The touch panel of claim 33, further including one or more recesses in the edge at the bent portion and wherein the first and second shear transducers are mounted to the edge in the recesses.

35. The touch panel of claim 34, further including one or more additional recesses in the edge at the bent portion and wherein the third and fourth shear transducer assemblies are mounted to the edge in the one or more additional recesses.

36. The touch panel of claim 33, wherein the edges are bent having a radius of curvature of greater than two times the wavelength of the greater of the first and second sensing waves.

37. The touch panel of claim 17, wherein the first, second, third and fourth pluralities of echelons are etched into the substrate and wherein the echelons are filled with a material having a refractive index about equal to a refractive index of the substrate.

38. The touch panel of claim 19, wherein the first, second, third,
fourth, fifth, sixth, seventh, and eighth pluralities of echelons are etched into the substrate and wherein the echelons are filled with a material having a refractive index about equal to a refractive index of the substrate.

39. A touch panel, comprising:
a substrate having first and second surfaces and edges extending between the first and second surfaces;
an acoustic touch system incorporated onto the first surface; and
a capacitance touch system incorporated onto the second surface,
wherein the acoustic touch system includes:
a first portion having:
a first plurality of echelons arranged on the first surface of the substrate in a first array along a first centerline, each echelon in the first plurality of echelons formed at a first angle relative to the first centerline;
a first shear transducer assembly mounted on the edge of the substrate, the first transducer assembly configured to generate a shear wave in a source wave mode in a first direction along the first centerline;

a second portion having:

a second plurality of echelons arranged on the first surface of the substrate in a second array along a second centerline, each echelon in the second plurality of echelons formed at a second angle relative to the second centerline, the second centerline being orthogonal to the first centerline; and a second shear transducer assembly mounted on the edge of the substrate, the second transducer assembly configured to generate a shear wave in a source wave mode in a second direction along the second centerline, wherein the shear wave generated by the first shear wave transducer assembly propagates along the first centerline and wherein the shear wave is reflected at the first angle by the one or more of the plurality of echelons in the first array to a first sensing wave or the shear wave is converted to a different wave mode than the source mode, wherein the first sensing wave is reflected off of an edge opposing the first centerline and is sensed by the first transducer assembly, and wherein the shear wave generated by the second shear wave transducer assembly propagates along the second centerline and wherein the shear wave is reflected at the second angle by the one or more of the plurality of echelons in the second array to a second sensing wave or the shear wave is converted to a different wave mode than the source mode, wherein the second sensing wave is reflected off of an edge opposing the second centerline and is sensed by the second transducer assembly.

40. The touch panel of claim 39, wherein the substrate is a single substrate.

41. The touch panel of claim 39, wherein the substrate is two substrates, and wherein the substrates are laminated to one another.

42. The touch panel of claim 39, wherein the first surface is a touch surface.

* * * * *